No. 868,370. PATENTED OCT. 15, 1907.
R. STOLA.
WIND POWER APPARATUS.
APPLICATION FILED MAR. 6, 1905.
3 SHEETS—SHEET 1.
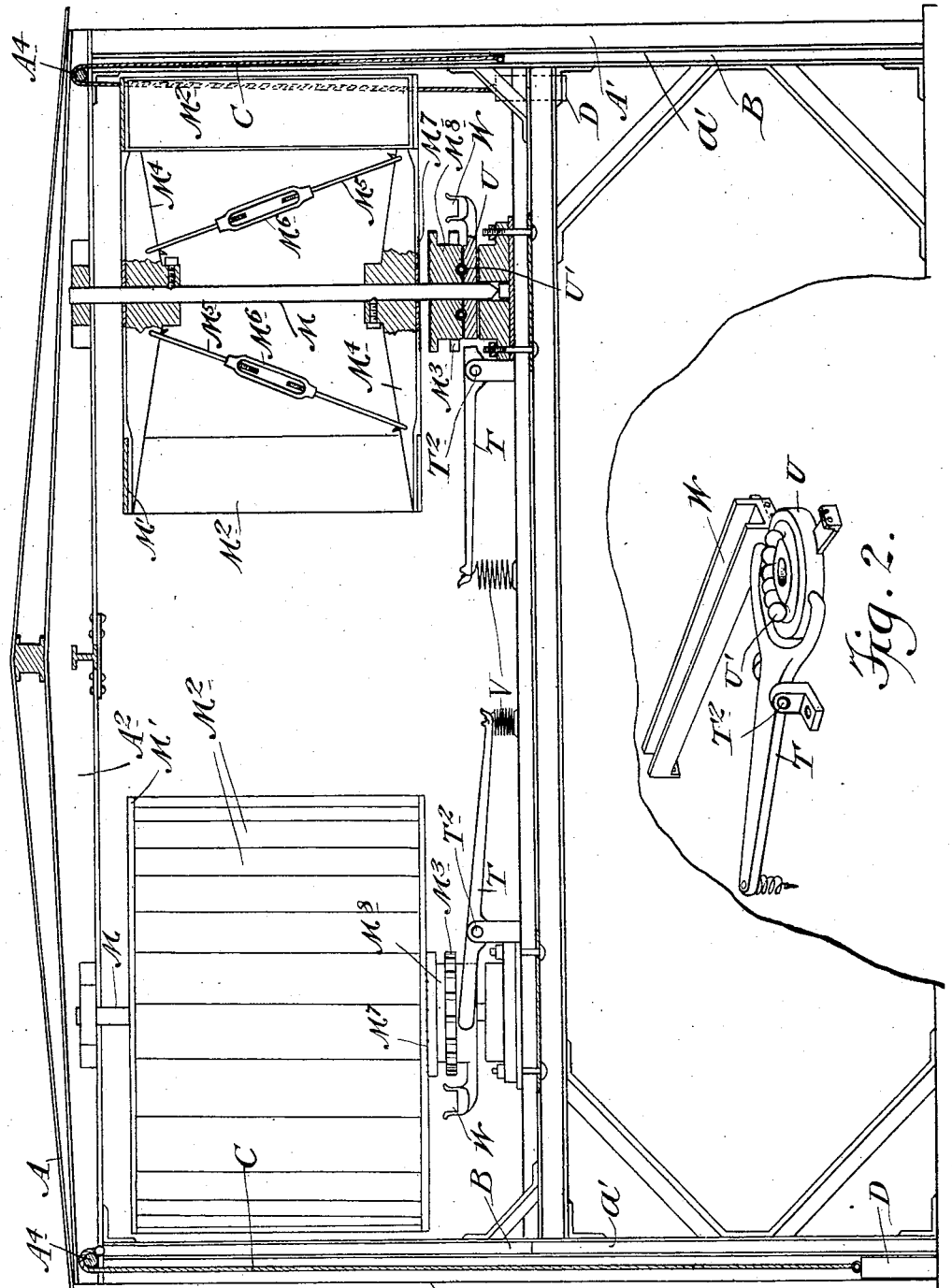

No. 868,370. PATENTED OCT. 15, 1907.
R. STOLA.
WIND POWER APPARATUS.
APPLICATION FILED MAR. 6, 1905.
3 SHEETS—SHEET 2.
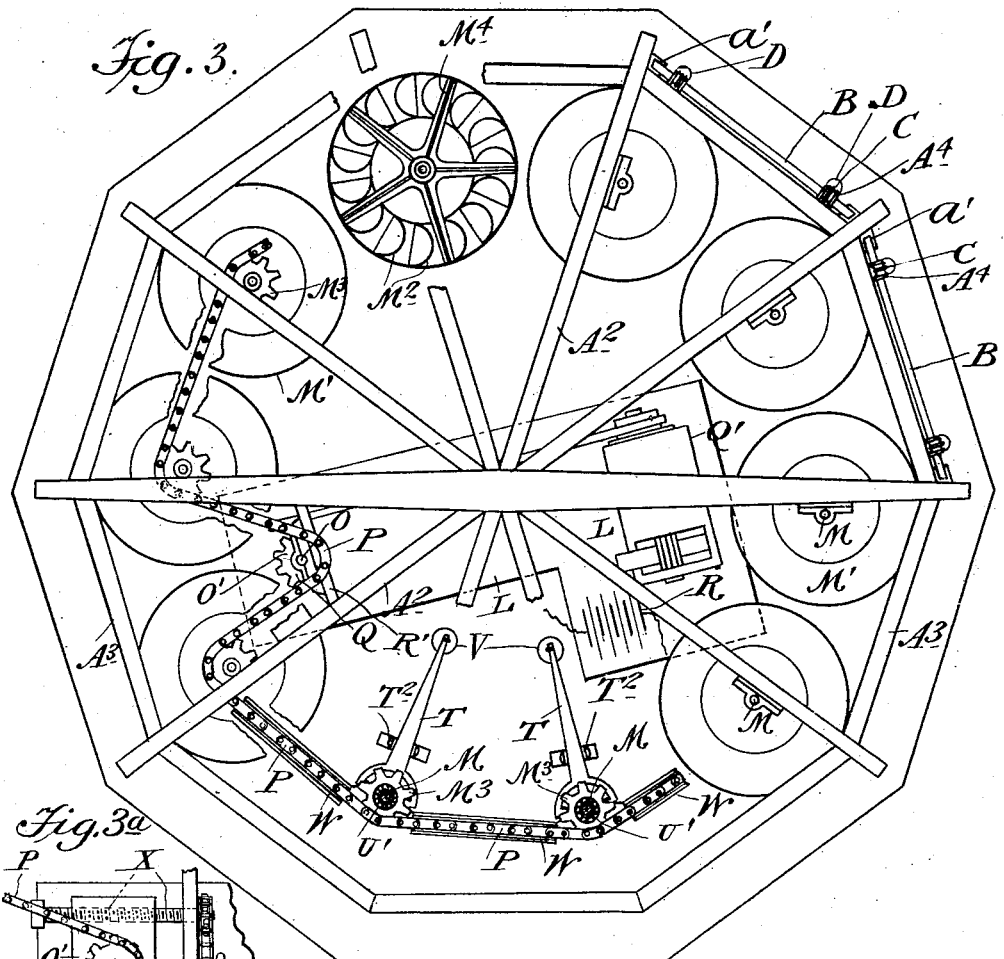
Fig. 3.
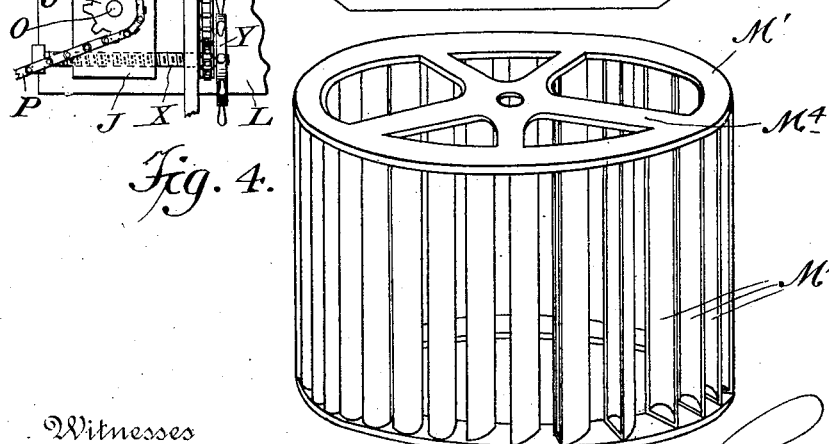
Fig. 3a.
Fig. 4.
Witnesses
Inventor
Rocco Stola
By his Attorney
Thomas Drew Stetson
THE NORRIS PETERS CO., WASHINGTON, D. C.

No. 868,370. PATENTED OCT. 15, 1907.
R. STOLA.
WIND POWER APPARATUS.
APPLICATION FILED MAR. 6, 1905.
3 SHEETS—SHEET 3.
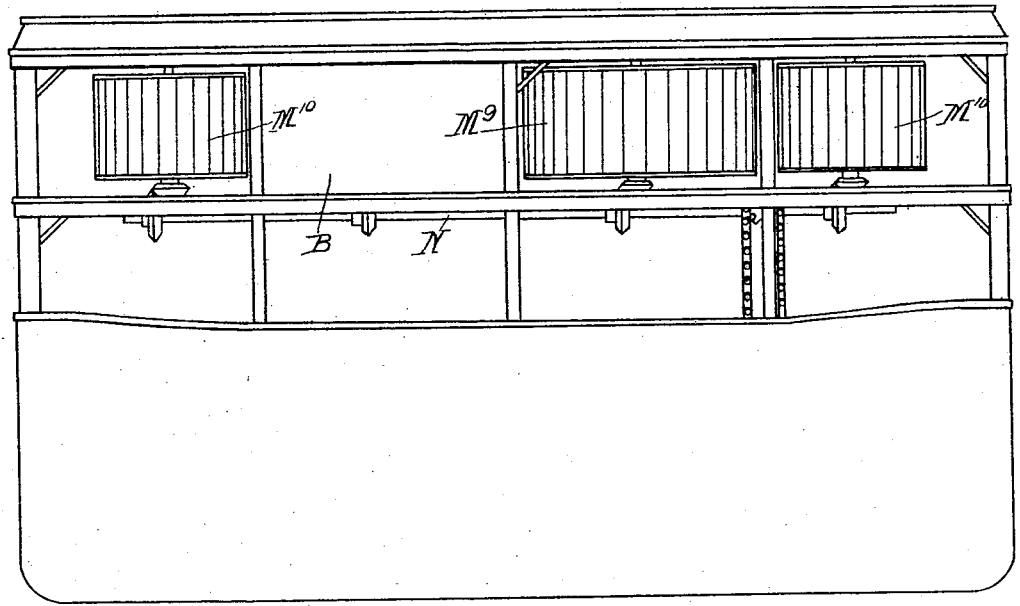
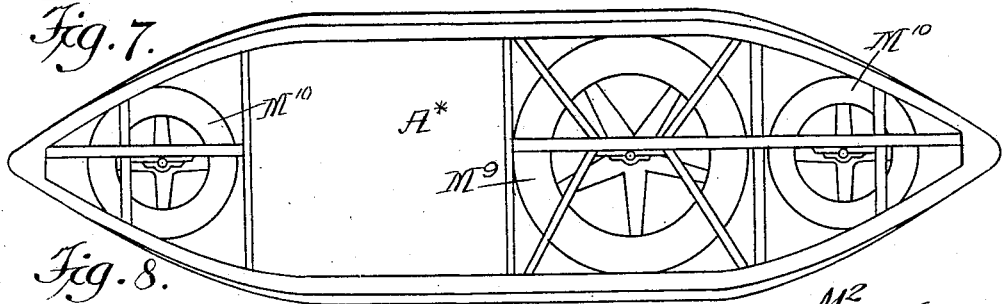
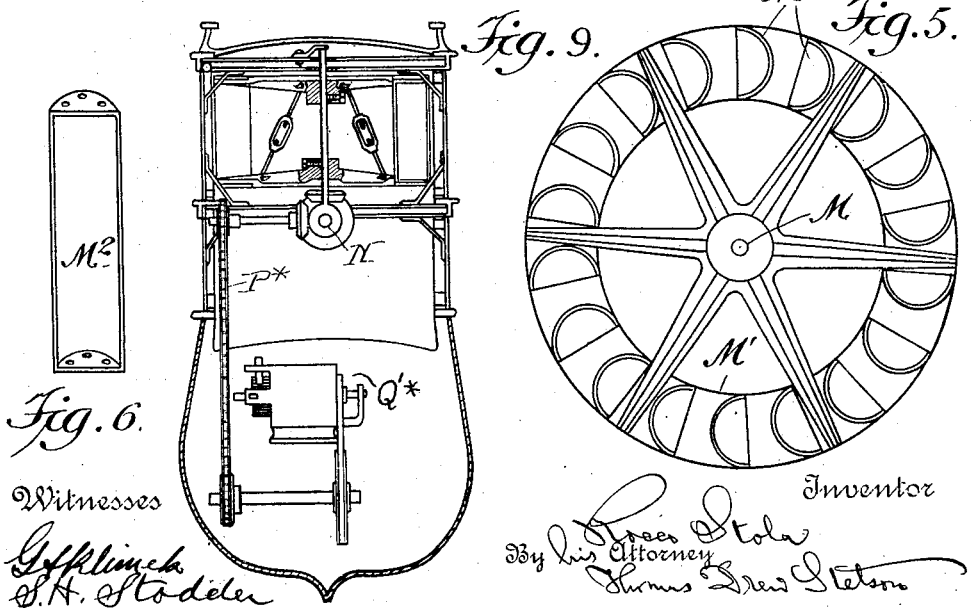

UNITED STATES PATENT OFFICE.

ROCCO STOLA, OF NEW YORK, N. Y.

WIND-POWER APPARATUS.

No. 868,370.  Specification of Letters Patent.  Patented Oct. 15, 1907.

Application filed March 6, 1905. Serial No. 248,786.

*To all whom it may concern:*

Be it known that I, ROCCO STOLA, a citizen of the United States, residing in the borough of the Bronx, in the city and State of New York, have invented a certain new and useful Improvement in Wind-Power Apparatuses, of which the following is a specification.

The invention may be used in all positions where there can be exposure to the wind and where sufficient room can be commanded. I will describe it as arranged to obtain power in a stationary structure, as a manufactory, on land.

I employ a number of wind wheels which turn each on an upright axis arranged to turn with little friction. These wind wheels are arranged in a series preferably circular. I have devised special provisions for communicating power therefrom and for regulating the exposure of the wheels according to the force of the wind.

Uniform continuous power is obtained from the series under the ordinary variable conditions of the wind by accumulating the power in storage batteries during the periods while the wind is strong and taking such power from the batteries during the periods of calm.

The following is a description of what I consider the best means of carrying out the invention.

The accompanying drawings form a part of this specification.

Figure 1 is a vertical section showing the invention applied in a frame with a roof. Fig. 2 is a perspective view of certain portions detached. Fig. 3 is a plan view of a frame with a series of wind wheels, screens and connections, and of an interior support, according to my invention, and Fig. $3^a$ is a plan view of such interior support showing parts which are omitted in the other figure. Fig. 4 is a perspective view of a wind wheel detached. Fig. 5 is a plan view. Fig. 6 is a perspective view of a bucket detached. Figs. 7, 8, and 9 show the invention applied on a vessel. Fig. 7 is a side view with one of the screens raised to exclude the wind from one of the wheels. Fig. 8 is a plan view with the roof partially removed and Fig. 9 is a cross section.

Similar letters of reference indicate like parts in all the figures where they appear.

A is a roof supported by a rigid framing preferably of metal, comprising upright posts, $A^1$ each having upright grooves $a^1$ as shown. These are braced by radial bars $A^2$ and circumferential bars $A^3$. Plane screens B are arranged to run up and down easily with their edges guided in the grooves.

C C are cords running over pulleys $A^4$ and extending down to be easily reached from below. D are weights carried on these cords approximately balancing the weight of the screens.

At a corresponding number of points within the posts and screens are upright shafts M which are supported on easily turning steps. Each carries a large wheel $M^1$ firmly fixed thereon having thin semi-cylindrical buckets $M^2$ adapted to receive the force of the wind and induce rotation all in the same direction.

$M^3$ are sprocket wheels, each fixed on a short sleeve loosely mounted on the shaft M, one wheel and sleeve on each shaft.

P is a pitch chain extending around and engaging all the sprocket wheels so that it can be moved by any one or more. There is a surplus of length to this chain and at one point it is deflected inward and engaged with a sprocket wheel $O^1$ which gives the power to a dynamo $Q^1$. The power generated by the revolutions is accumulated in storage batteries R ready for subsequent use by motors not shown, which may be any ordinary or suitable form of electric motors. The connection of the dynamo to the storage batteries is effected by pulleys and a quarter twisted belt in the obvious manner. L is a supporting carriage mounted within the structure. The upright shaft O on which the sprocket wheel $O^1$ is carried, and also the storage battery or batteries R and the dynamo $Q^1$, are mounted on this carriage L. It is important that the sprocket wheel $O^1$ shall be movable inward and outward relatively to the adjacent wheels $M^1$ so that such sprocket wheel shall perform the double function, first, of an adjustable tightener for the pitch chain, and second, of a means for receiving and utilizing the power communicated thereto through such chain. This can be accomplished by obvious provisions for moving the entire carriage L automatically or at will. It may be understood that the carriage is thus movable by running on stationary ways, not shown, in the directions to tighten and slacken the pitch chain, by the ordinary expedient of stout cords and weights, not shown. I have in Fig. $3^a$ shown further means for adjusting the sprocket wheel $O^1$ and its connections. This device shown in Fig. $3^a$ may be used as the means for effecting the tightening and slackening of the pitch chain P without moving the carriage L, or such sprocket may be moved simultaneously with any adjustment of the carriage L to harmonize the action of the sprocket wheel and the dynamo. With either or both means the sprocket wheel $O^1$ in addition to its function of receiving the power and transmitting it to the dynamo or other machinery to be driven, may be easily and nicely adjusted in position as the pitch chain P changes its length by wear or changes of temperature.

J is what I will term a sub-carriage, movable to a limited extent on the main carriage L, and furnishing bearings for the shaft O of the sprocket wheel $O^1$.

X X are screws tapped through this sub-carriage and having bearings carried on the main carriage L. A sprocket wheel on each of these screws and a pitch chain running thereon, cause them to turn in harmony. Y is a hand wheel on an extension of one of the screws which allows it to be operated at will.

The several screens B are raised and lowered according to the direction and force of the wind. All the screens on the lee side of the structure may be completely lowered to afford a free escape of wind there. The screens on the "weather" side are raised to varying degrees so as to screen the wheels from the wind according as the force of the latter shall be in excess. When the wind is light all the screens are quite down. Deep recesses $a'$ are provided in the structure in order to give sufficient depth for the full descent of the screens.

The several wind wheels are constructed with diametrical bars $M^4$ each supported by an inclined tie $M^5$ with a turn buckle $M^6$ to allow of adjustment to resist sagging.

The wind motors of the Stola system can be made of any diameter or height, and with any number of blades. The said wind motors may be attached to a boat or ship. They may be used on factories or other buildings, in the country, on mountains or plains.

With any good system of accumulation of electricity steam can be obtained through the medium of transformation of the electricity into heat.

I provide for liberating any one of the wheels when desired while retaining its shaft and sprocket wheel in place and causing the latter to each maintain its place in the series. Thus I can when the wind is uniform, set free all the wind wheels on the lee side, but I like to retain the wheels in full connection through a large part of the series in order both to be ready to be actuated with full effect when the wind is changeable in direction and to render available the considerable weight of the wheels to increase the fly-wheel effect when there are fluctuations in the wind or in the resistance.

$M^7$ is a circular roughened surface on the under face of each wheel.

The sprocket wheel $M^3$ has a roughened upper face.

Any given sprocket wheel is held up on a forked lever T through the aid of a support U and ball-bearing $U^1$ and the wheel revolved by the superior force of the wind acting on the hollow side of each bucket, over that which it exerts on the full side, contributes to the power communicated through the chain P and its connections. But when for any reason it is preferred to liberate a wheel the corresponding lever T is turned on its fulcrum $T^2$ and the sleeve $M^8$ and sprocket wheel $M^3$ is lowered. Thus conditioned the roughened surfaces separate and the sprocket wheel thenceforward serves only as an idler to carry the chain. Readjusting the lever T again takes the rough surface of the wheel upon the sleeve and it again contributes its force to the power imparted through the chain to the dynamo or other machinery.

The gravity of the pitch chain P is supported by smooth ways W matching under the chain in its run between the several sprockets $M^3$. These ways are forked and engaged so that depressing the long arm of the lever T raises the support U and through the ball bearing $U^1$ lifts the sprocket $M^3$ and engages the rough surfaces. Liberating the lever allows the spring V to lift its long arm and by separating the rough surfaces of M and $M^3$ to disconnect the wheel.

Modifications may be made without departing from the principle or sacrificing the advantages of the invention. There may be a greater or less number of the wind wheels with a corresponding change in the number of the posts and screens. An automatic governor can be connected with the mechanism not shown to shift the screens up and down as the force of the wind shall vary.

In the construction indicated in Figs. 7, 8, and 9 there are two sizes of my wheels arranged in a straight series and connected by bevel gearing to a longitudinal shaft N which latter communicates the power of the whole through a pitch chain $P^3$ and sprocket wheels to a dynamo $Q'^3$, allowing great facility for adjustment.

I claim as my invention:

1. A circular series of wind wheels mounted on vertical shafts each equipped with a sprocket wheel, in combination with an endless pitch chain extending around horizontally connecting the whole, and with a movable wheel and operations carried on a surface L moving radially arranged to perform the double functions of taking up the slack of such chain and communicating power for useful work, all substantially as herein specified.

2. A continuous series of wind wheels, each equipped with a sprocket wheel in combination with an endless pitch chain connecting the whole and with provisions by a friction coupling for disconnecting a wheel when required, all substantially as herein specified.

3. A continuous series of wind wheels, each equipped with a sprocket wheel in combination with an endless pitch chain connecting the whole, provisions by a friction coupling for disconnecting a wheel when required and with movable screens and means as shown for practically balancing the latter by weights adapted to regulate the force all substantially as herein specified.

4. A series of wind wheels in combination with a dynamo, a storage battery for receiving and storing the force, provisions by a friction coupling for disconnecting a wheel when required, movable screens balanced, and an endless pitch chain connecting the train all arranged for joint operation substantially as herein specified.

5. A continuous series of wind wheels, each equipped with a sprocket wheel in combination with an endless pitch chain connecting the whole and with ways W arranged to support the chains between the several sprocket wheels and to be raised and lowered with the latter all substantially as herein specified.

Signed at New York city in the county of New York and State of New York this third day of March A. D. 1905.

ROCCO STOLA.

Witnesses:
THOMAS DREW STETSON,
FRANK CERRUTI.